(12) United States Patent
Flock et al.

(10) Patent No.: US 10,076,864 B2
(45) Date of Patent: Sep. 18, 2018

(54) METHOD FOR PRODUCING A STRUCTURAL COMPONENT

(75) Inventors: Dustin Flock, Köln (DE); Bernd Meier, Attendorn (DE)

(73) Assignee: ADIENT LUXEMBOURG HOLDING S.A.R.L., Luxembourg (LU)

(*) Notice: Subject to any disclaimer, the term of this patent is extended or adjusted under 35 U.S.C. 154(b) by 1143 days.

(21) Appl. No.: 14/359,012

(22) PCT Filed: Sep. 13, 2012

(86) PCT No.: PCT/EP2012/067953
§ 371 (c)(1),
(2), (4) Date: Jan. 5, 2015

(87) PCT Pub. No.: WO2013/072091
PCT Pub. Date: May 23, 2013

(65) Prior Publication Data
US 2015/0140242 A1    May 21, 2015

(30) Foreign Application Priority Data
Nov. 17, 2011   (DE) ................. 10 2011 086 601
Feb. 21, 2012   (DE) ................. 10 2012 202 620

(51) Int. Cl.
*B29C 53/04*    (2006.01)
*B29C 51/00*    (2006.01)
(Continued)

(52) U.S. Cl.
CPC ........ *B29C 51/002* (2013.01); *B29C 45/0055* (2013.01); *B29C 51/20* (2013.01);
(Continued)

(58) Field of Classification Search
None
See application file for complete search history.

(56) References Cited

U.S. PATENT DOCUMENTS

| 5,567,509 A | 10/1996 | Gautier |
| 5,902,533 A | 5/1999 | Munger et al. |
(Continued)

FOREIGN PATENT DOCUMENTS

| DE | 37 42 852 A1 | 7/1989 |
| DE | 601 14 275 T2 | 7/2006 |
(Continued)

OTHER PUBLICATIONS

Office Action dated May 29, 2015, received in corresponding Chinese Application No. 201280056399.4, 7 pages.
(Continued)

*Primary Examiner* — Barbara J Musser
(74) *Attorney, Agent, or Firm* — Foley & Lardner LLP

(57) ABSTRACT

A method for producing a structural component from an organometallic sheet includes a first step in which the organometallic sheet is preheated, introduced into a tool and subsequently re-formed. In a second step, a region of the re-formed organometallic sheet is heated. In a third step at least the heated region of the re-formed organometallic sheet is re-formed further in such a way that it enters into a material bond with a further region of the organometallic sheet to form an at least partly closed hollow profile. A device for carrying out the method for producing a structural component from an organometallic sheet and a structural component produced by the method also are described.

3 Claims, 3 Drawing Sheets

Figure 1:
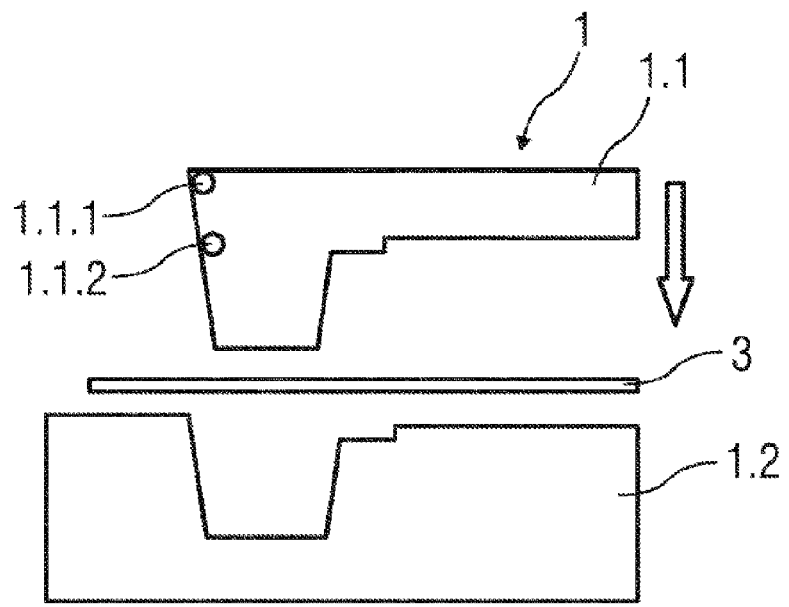

(51) Int. Cl.
    B29C 70/34      (2006.01)
    B29C 70/46      (2006.01)
    B29C 45/00      (2006.01)
    B29C 51/20      (2006.01)
    B29C 51/30      (2006.01)
    B29C 70/06      (2006.01)
    B29K 101/12     (2006.01)
    B29K 105/06     (2006.01)
    B29K 105/00     (2006.01)
    B29L 22/00      (2006.01)
    B29L 31/44      (2006.01)

(52) U.S. Cl.
    CPC .............. *B29C 51/30* (2013.01); *B29C 53/04* (2013.01); *B29C 70/06* (2013.01); *B29C 70/345* (2013.01); *B29C 70/46* (2013.01); *B29K 2101/12* (2013.01); *B29K 2105/06* (2013.01); *B29K 2105/256* (2013.01); *B29L 2022/00* (2013.01); *B29L 2031/443* (2013.01); *Y10T 428/1314* (2015.01); *Y10T 428/1362* (2015.01)

(56) References Cited

U.S. PATENT DOCUMENTS

2005/0253294 A1*  11/2005  Takano ................... B29C 70/34
                                                          264/138
2010/0215887 A1*  8/2010   Kawabe ................ B29C 43/146
                                                           428/56
2010/0270700 A1   10/2010  Jumel

FOREIGN PATENT DOCUMENTS

| | | |
|---|---|---|
| DE | 1020050 12 106 A1 | 9/2006 |
| EP | 1 559 533 A1 | 8/2005 |
| JP | 63-041121 A | 2/1988 |
| JP | 02-020329 A | 1/1990 |
| JP | 06-099506 A | 4/1994 |
| JP | 09-109240 A | 4/1997 |
| JP | 2008-222255 A | 9/2008 |

OTHER PUBLICATIONS

International Search Report in PCT/EP2012/067953 dated Dec. 4, 2012.

Office Action dated Oct. 18, 2012 in corresponding German Patent Application No. 102012202620.7 (5 pages) and English machine translation (6 pages).

Office Action dated Mar. 24, 2015 received in corresponding Japanese Application No. 2014-541576 (4 pages) and English machine translation (3 pages).

* cited by examiner

METHOD FOR PRODUCING A STRUCTURAL COMPONENT

CROSS REFERENCE TO RELATED APPLICATIONS

The present application is a U.S. National Stage of International Application No. PCT/EP2012/067953 filed on Sep. 13, 2012, which claims the benefit of German Patent Application No. 10 2011 086 601.9 filed on Nov. 17, 2011 and German Patent Application No. 10 2012 202 620.7 filed on Feb. 21, 2012, the entire disclosures of all of which are incorporated herein by reference.

Description

The invention relates to a method for producing a structural component as described further herein. The invention further relates to a device for carrying out the method as described further herein and a structural component as described further herein.

Structural components made of fiber composite structures, also called organometallic sheets, are continuous fiber-reinforced thermoplastic sheets and are known in the prior art, for example for producing seat backrest rear walls. Generally, to this end an organometallic sheet is shaped in a corresponding tool and subsequently provided with functional elements, such as for example plastics ribs which are preferably injection-molded thereon.

For producing structural components in the form of hollow bodies, i.e. with a closed profile, different methods are known from the prior art. In particular, in this case the so-called fit hybrid method and the twin sheet method are used.

By means of the fit hybrid method, the shaping of an organometallic sheet and the simultaneous injection-molding is possible in one processing step. Generally, after shaping the organometallic sheet, the closed profiles to be manufactured are produced by means of a subsequent bonding process.

In the twin sheet method, also called the double stretch drawing method or twin sheet thermoforming method, two semi-finished products (for example organometallic sheets) are shaped and at the same time welded to form a single structural component with a hollow body profile. For example, the two semi-finished products are clamped above one another in a clamping frame and subsequently heated on one side, wherein said semi-finished products are thermoformed by means of a double-sided tool and at the same time welded on the periphery. Alternatively, the semi-finished products are heated in two separate clamping frames and thermoformed in two opposing tool halves. By bringing the tool together, the thermoformed semi-finished products are subsequently welded.

It is the object of the present invention to specify a method for producing a structural component which is improved and, in particular, more cost-effective relative to the prior art. It is also the object of the present invention to specify a device for carrying out the method which is improved relative to the prior art as well as an improved structural component.

The object is achieved according to the invention with regard to the method as described further herein, with regard to the device as described further herein, and with regard to the structural component as described further herein.

Advantageous embodiments of the invention form the subject matter of the sub claims.

In a method for producing a structural component from an organometallic sheet according to the invention it is provided that in a first step the organometallic sheet is preheated, introduced into a tool and subsequently shaped, in a second step a region of the shaped organometallic sheet is heated and in a third step at least the heated region of the shaped organometallic sheet is shaped further such that said region enters into a material bond with a further region of the organometallic sheet to form an at least partially closed hollow profile.

By means of the at least partially closed hollow profile the structural component advantageously has increased torsional rigidity. Thus the structural component produced by means of the method is reduced in weight and is particularly flexurally rigid. For example, the structural component for producing a seat backrest rear wall is suitable for a vehicle seat in order to stiffen said seat backrest rear wall advantageously.

In a preferred embodiment of the invention, the organometallic sheet is reinforced by a thermoplastic material when the region is heated. In this manner, for example, a ribbed structure may be applied to the organometallic sheet, said ribbed structure being preferably formed from the same thermoplastic material as the organometallic sheet.

Particularly preferably, in this case the thermoplastic material is applied by a material bond to a surface of the organometallic sheet. Thus from the organometallic sheet and the thermoplastic reinforcing structure, an integrated, and thus integral, structural component is formed.

Preferably, by means of the shaping process the organometallic sheet is shaped into a partial shape of the structural component according to the first step, and by means of the further shaping process the organometallic sheet is shaped into a final shape of the structural component according to the third step.

In a preferred embodiment of the invention, for the shaping process the tool is closed according to the first step and for the further shaping process the tool is opened according to the third step.

In a device for carrying out a method for producing a structural component from an organometallic sheet by means of a tool, according to the invention said tool is configured as an at least two-part composite body forming a cavity, with a first mold body and a second mold body, wherein one of the mold bodies on the cavity side has a shaped profile as a positive contour, wherein at least one of the mold bodies has at least one heatable portion and wherein the tool is coupled to a slide which is preferably movable along a surface of one of the bodies on the cavity side.

By means of the device, a structural component made of an organometallic sheet with a closed hollow profile is able to be produced in a few steps using only one tool. To this end, in a particularly advantageous manner, no further joining and/or bonding processes are required.

The tool is advantageously configured as a combination tool consisting of a shaping tool and an injection-molding tool. Thus two different processes are possible in one tool, whereby short production times and material savings are possible due to a low number of tool components.

The organometallic sheet of the structural component according to the invention, which is produced according to the method already described, has a closed hollow profile. Due to the closed profile, biaxially the structural component has a higher geometric moment of inertia in comparison with a structural component with an open profile. As a result, a support is able to be designed to be narrower, whereby material and weight savings are achieved. By means of such a structural component, a seat backrest wall may be produced in a cost-effective manner with a very high degree of rigidity. Moreover, the injection-molded ribbed structures are protected by means of the closed profile so that said rib structures are able to be designed to be narrower.

Figure 2:
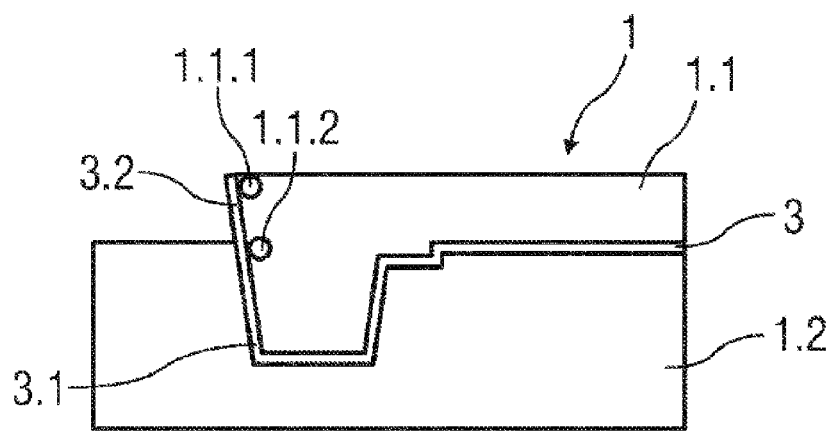
Figure 3:
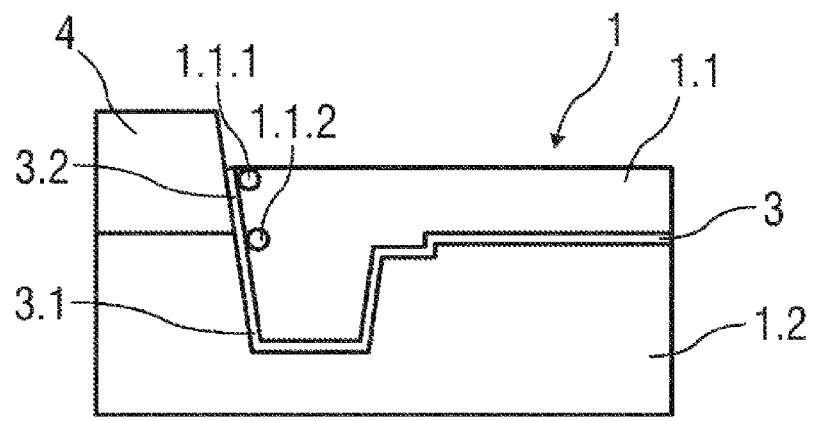
Figure 4:
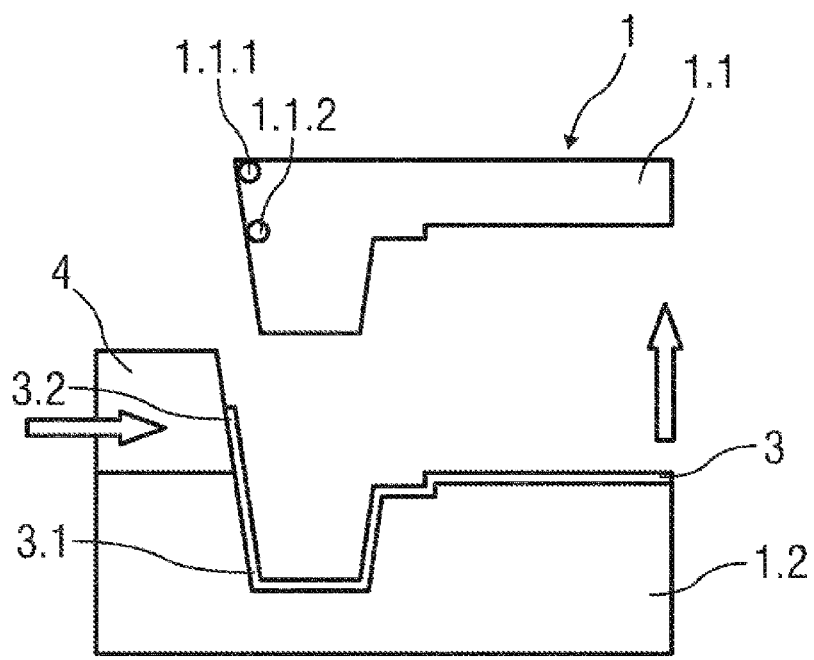
Figure 5:
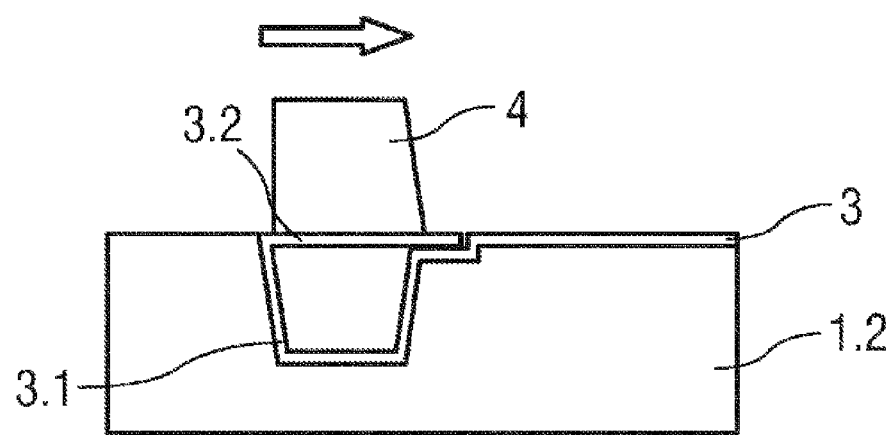
Figure 6:
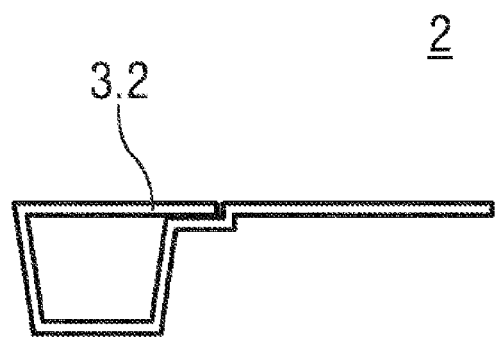

The invention is described in more detail with reference to the accompanying schematic drawings, in which:

FIG. 1 shows schematically a sectional view of a tool during a first method step of a method according to the invention for producing a structural component, FIG. 2 shows schematically a sectional view of the tool according to FIG. 1 in a second method step, FIG. 3 shows schematically a sectional view of the tool according to FIG. 1 in a third method step, FIG. 4 shows schematically a sectional view of the tool according to FIG. 1 in a fourth method step, FIG. 5 shows schematically a sectional view of the tool according to FIG. 1 in a fifth method step and FIG. 6 shows schematically a sectional view of a structural component produced by means of the method steps according to figures 1 to 5.

Parts which correspond to one another are provided in all the figures with the same reference numerals.

In FIG. 1 a sectional view of a tool 1 is shown schematically in a first method step of a method according to the invention for producing a structural component 2 shown in FIG. 6.

The structural component 2 is formed from a so-called organometallic sheet 3, which in the present exemplary embodiment is a conventional organometallic sheet. An organometallic sheet 3 is a planar semi-finished product made of a thermoplastic material in which a woven material made of glass fibers, carbon fibers and/or aramid fibers or a mixture thereof is incorporated, such that the fibers are completely wetted by the thermoplastic material. Organometallic sheets 3 are thus continuous fiber-reinforced thermoplastic sheets.

For corresponding treatment of the organometallic sheet 3 said organometallic sheet is at least partially arranged inside the tool 1.

The tool 1 is preferably a combination tool consisting of a shaping tool and an injection-molding tool and formed as a two-part composite body forming a cavity with a first mold body 1.1 and a second mold body 1.2. The first mold body 1.1 in this case is arranged opposite the second mold body 1.2. In the present exemplary embodiment according to FIG. 1 the tool 1 is open.

The first mold body 1.1 has on its side facing the second mold body 1.2 a shaped profile as a positive contour of the profile of the organometallic sheet 3 to be produced.

The second mold body 1.2 has on its side facing the first mold body 1.1 a recess. The shaped profile of the first mold body 1.1 and the recess of the second mold body 1.2 form in this case the cavity of the tool 1.

Both the first and the second mold body 1.1, 1.2 in each case preferably consist of a metal or a metal alloy or a ceramic or a plastics material. It is also possible that the mold bodies 1.1, 1.2 are configured differently in the material.

If ceramic or plastics is used as material, the surfaces of the first and/or second mold bodies 1.1, 1.2 are expediently provided with a metal coating.

In the present exemplary embodiment, the first mold body 1.1 on the edge has two heatable portions 1.1.1, 1.1.2 which serve for partial heating of the organometallic sheet 3. Alternatively, the first mold body 1.1 may also have one, or more than two, heatable portions 1.1.1, 1.1.2. The heatable portions 1.1.1, 1.1.2 may alternatively also be arranged in other suitable regions of the first mold body 1.1. Moreover, it is also possible that the second mold body 1.2 alternatively or additionally has heatable portions 1.1.1, 1.1.2.

For shaping the organometallic sheet 3, said organometallic sheet is at least partially preheated and arranged between both mold bodies 1.1, 1.2. The organometallic sheet 3 in this case has dimensions which are larger in comparison with the dimensions of the cavity of the tool 1 so that said organometallic sheet is arranged partially outside the cavity of the tool 1.

Subsequently, the mold bodies 1.1, 1.2 are moved toward one another, i.e. the tool 1 is closed and the organometallic sheet 3 is correspondingly shaped as shown in FIG. 2. In this case a recess 3.1 is shaped out of the organometallic sheet 3, the cross section thereof having an approximately trapezoidal profile.

A region 3.2 of the organometallic sheet 3 in this case is adjacent to the heatable portions 1.1.1, 1.1.2 of the first mold body 1.1, wherein one surface of the region 3.2 faces the heatable portions 1.1.1, 1.1.2 and a further surface of the region 3.2 is exposed.

In a method step shown in FIG. 3, which is alternative or additional to the previous shaping process, in a first partial step a slide 4 is positioned inside the tool 1, wherein a surface of one side of the slide 4 bears against the exposed surface of the region 3.2.

In a second partial step, a thermoplastic material is preferably injection-molded around the organometallic sheet 3. In this manner, a ribbed structure (not shown) which is particularly preferably formed from the same thermoplastic material as the organometallic sheet 3, is applied to a surface of the organometallic sheet 3 so that an integrated, and thus integral, component is formed from the organometallic sheet 3 and ribbed structure.

For further shaping of the organometallic sheet 3, when the ribbed structure is injection-molded around the organometallic sheet 3, the region 3.2 is heated by means of the heatable portions 1.1.1, 1.1.2 of the first body 1.1. Thus particularly short cycle times are possible for producing the structural component 2.

In a method step shown in FIG. 4, subsequent to the previous shaping process and/or injection-molding from behind, the tool 1 is opened, i.e. the first mold body 1.1 is spaced apart from the second mold body 1.2. In the present exemplary embodiment the first mold body 1.1 is moved vertically upwards in the direction of observation, (shown by means of an arrow).

In FIG. 5, the slide 4 is subsequently moved horizontally to the right in the direction of observation (shown by means of a further arrow). At the same time, the heated region 3.2 is shaped and, in particular, enters into a material bond with a further portion of the organometallic sheet 3 to form a closed hollow profile. The recess 3.1 is thus closed by means of the shaped portion 3.2. By means of a material bond, complex and cost-intensive bonding processes are avoided so that the method according to the invention is thus particularly cost-effective.

In FIG. 6, a cross section of a side view of the structural component 2 produced from the organometallic sheet 3 is shown.

For example, a seat backrest rear wall of a vehicle seat may be produced by means of the structural component 2, wherein headrest support rod reception sleeves, a seat belt deflector and/or a receiver for a seat belt retractor may be shaped into the injection-molded ribbed structure.

The closed profile of the structural component 2 permits in a particularly advantageous manner increased torsional rigidity so that, for example, the entire seat backrest rear wall may be stiffened.

LIST OF REFERENCE NUMERALS

1 Tool
1.1 First mold body
1.1.1, 1.1.2 Heatable portions
1.2 Second mold body
1.2 Structural component
2 Organometallic sheet
3.1 Recess
3.2 Region
4 Slide

The invention claimed is:

1. A method for producing a structural component from a thermoplastic sheet, the method comprising:

in a first step, preheating the thermoplastic sheet, introducing the thermoplastic sheet into a tool, and subsequently shaping the thermoplastic sheet by closing the tool;

in a second step, heating a region of the shaped thermoplastic sheet and injection molding a thermoplastic material around the thermoplastic sheet within the tool when the region is heated; and in a third step, opening the tool and moving at least the heated region of the shaped thermoplastic sheet with a slide to further shape the thermoplastic sheet after the tool is opened such that said region enters into a material bond with a further region of the thermoplastic sheet to form an at least partially closed hollow profile.

2. The method as claimed in claim 1, further comprising attaching the thermoplastic material to a surface of the thermoplastic sheet with a material bond.

3. The method as claimed in claim 1, wherein, by the shaping process, the thermoplastic sheet is shaped into a partial shape of the structural component according to the first step, and, by the further shaping process, the thermoplastic sheet is shaped into a final shape of the structural component according to the third step.

* * * * *